United States Patent [19]

Crouse et al.

[11] Patent Number: 5,394,526
[45] Date of Patent: Feb. 28, 1995

[54] DATA SERVER FOR TRANSFERRING SELECTED BLOCKS OF REMOTE FILE TO A DISTRIBUTED COMPUTER NETWORK INVOLVING ONLY SINGLE DATA TRANSFER OPERATION

[75] Inventors: Donald D. Crouse, Murphy, Tex.; Kenneth M. Partyka, Blaine, Minn.

[73] Assignee: LSC, Inc., Minneapolis, Minn.

[21] Appl. No.: 11,966

[22] Filed: Feb. 1, 1993

[51] Int. Cl.$^6$ ............................................. G06F 13/00
[52] U.S. Cl. .................................. 395/200; 364/225.4; 364/265.3; 364/284.4; 364/DIG. 1; 395/600
[58] Field of Search ................ 395/200, 250, 275, 600; 364/242.3, 242.31, 225.4, 265.3, 284.4

[56] References Cited

U.S. PATENT DOCUMENTS

| | | | |
|---|---|---|---|
| 4,441,162 | 4/1984 | Lillie | 364/900 |
| 4,485,438 | 11/1984 | Myrmo et al. | 364/200 |
| 4,771,286 | 9/1988 | Niessen et al. | 340/825.52 |
| 5,121,480 | 6/1992 | Bonke et al. | 395/250 |
| 5,163,131 | 11/1992 | Row et al. | 395/200 |

OTHER PUBLICATIONS

"The Uni-Tree TM Virtual Disk System: An Overview" General Atomics/Discos Division (1991).
"Epoch-1 Infinite Storage TM Server Technical Summary", Epoch Systems, Inc., Rev. 11, (Jul. 1990).
Montgomery, J. "Product Review: Silicon Graphics 4D/400 Server", *Digital Review*, Sep. 9, 1991.

*Primary Examiner*—Thomas C. Lee
*Assistant Examiner*—Moustafa Mohamed Meky
*Attorney, Agent, or Firm*—Patterson & Keough

[57] ABSTRACT

A pipelined data server having an improved data transfer architecture is used with a distributed computer network and a plurality of secondary storage devices to efficiently transfer data between the network and the secondary storage devices. The pipelined, multiprocessor data server includes a common inter-processor bus that connects one or more communication processors and file processors to one or more device processors, each having a buffer memory as part of the device processor. The common bus provides for global direct access to each of the buffer memories in the device processors by any of the other processors. The buffer memories are also connected to the secondary storage device attached to the device processor by a DMA transfer path in the device processor. In this way, data transfers can occur between the secondary storage device and the network with only one data transfer across the common bus. The data transfer architecture of the device processor of the present invention is also organized in a pipelined manner so as to allow for multiplexed data transfers among the microprocessor, bus interface, I/O controller and buffer memory which comprise the device processor.

2 Claims, 7 Drawing Sheets

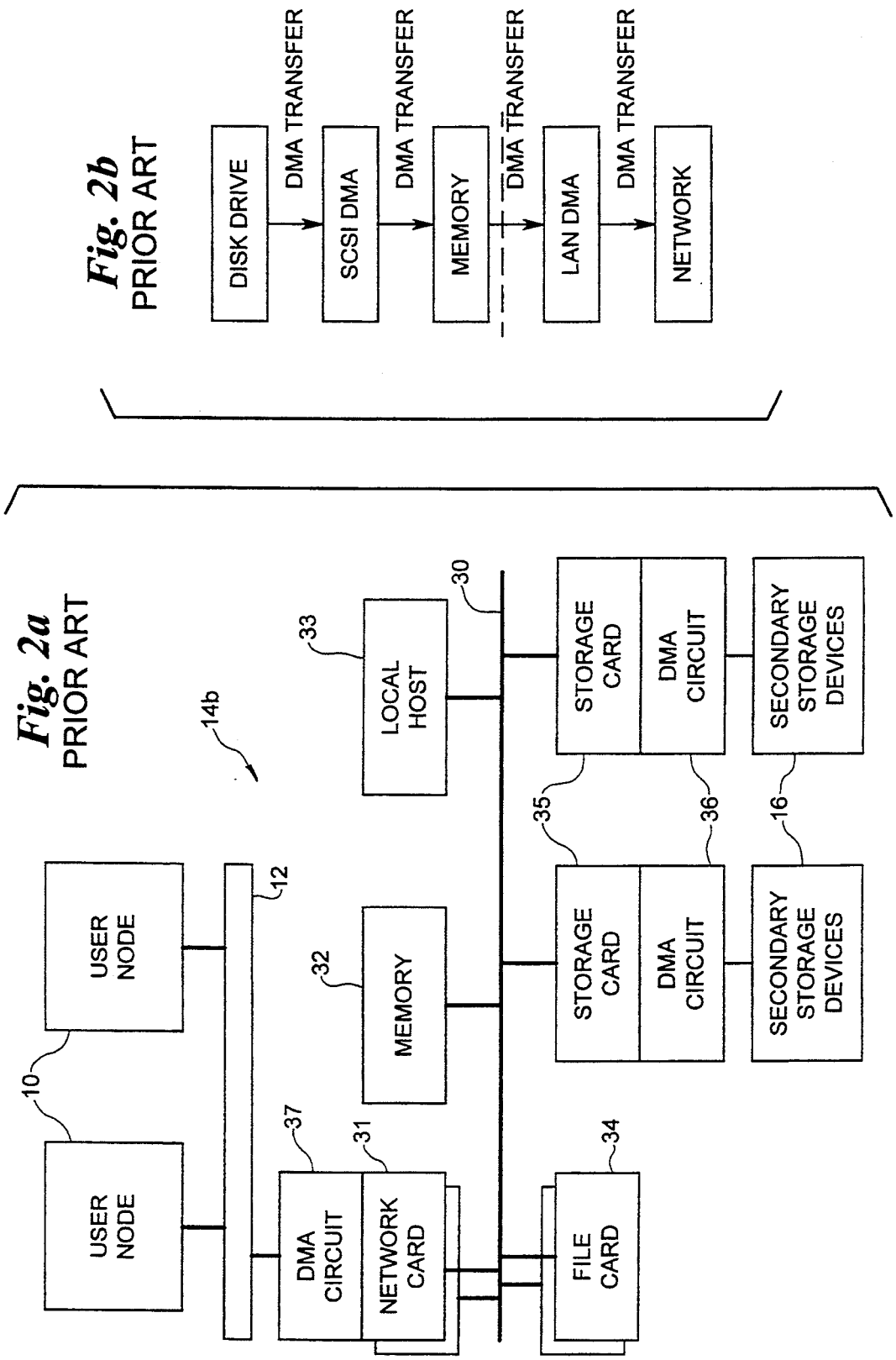

DATA SERVER FOR TRANSFERRING SELECTED BLOCKS OF REMOTE FILE TO A DISTRIBUTED COMPUTER NETWORK INVOLVING ONLY SINGLE DATA TRANSFER OPERATION

RELATED APPLICATIONS

This application is related to the following co-pending application, filed concurrently herewith and assigned to the same assignee, entitled ARCHIVING FILE SYSTEM FOR A DATA SERVER IN A DISTRIBUTED NETWORK ENVIRONMENT, Ser. No. 08/012,298, filed Feb. 1, 1993, still pending.

TECHNICAL FIELD

The present invention relates generally to controllers for secondary storage systems, such as disk drives, tape drives and the like, for computer processing systems. More particularly, the present invention relates to a pipelined, multiprocessor data server for a distributed computer network environment having improved data transfer characteristics.

BACKGROUND OF THE INVENTION

The use of secondary storage systems to provide for online storage for a computer processing systems that is separate from the primary or main memory of the computer processing system is well known. Examples of current secondary storage systems include magnetic disk drives, optical disk drives, magnetic tape drives, solid state disk drives and bubble memories. Typically, secondary storage systems have much larger memory capacities than the primary memory of a computer processing system; however, the access to data stored on most secondary storage systems is sequential, not random, and the access rates for secondary storage systems can be significantly slower than the access rate for primary memory. As a result, individual bytes of data or characters of information are usually stored in a secondary storage system as part of a larger collective group of data known as a file.

In a distributed computer network environment, a user program can access both local files, i.e. files stored on secondary storage systems directly connected to the computer processor, as well as remote files, i.e., files stored on secondary storage systems that are accessed via a distributed network. As the popularity of distributed computer networks has increased, the demand to store ever increasing volumes of data as remote files has also increased. In response to this demand, a number of remote secondary storage systems have been developed primarily for the purpose of storing remote files. These secondary storage systems, known as data servers, file servers or information servers, are not connected to an individual computer like a traditional secondary storage device; rather they are connected to the distributed network itself. Examples of current large capacity data servers for a distributed computer network environment using the System V operating system program include: the UniTree ™ Virtual Disk System available from General Atomics/DISCOS Division, San Diego, Calif.; the Epoch-1 Infinite Storage ™ Server available from Epoch Systems, Inc., Westborough, Mass.; and the Auspex NS 5000 ™ Network Server available from Auspex Systems, Inc., Santa Clara, Calif.

While some network data servers like the UniTree ™ Virtual Disk System are software-based packages implemented on a variety of traditional workstation platforms, most current network data servers utilize some type of specialized designed processor hardware that improves the performance and capacity of the networked secondary storage system. The most notable of these specialized hardware designs are the multiprocessor network data servers which have multiple processors operating in parallel in order to facilitate servicing more than one file request at a time. The Epoch-1 Infinite Storage ™ Server, for example, uses a single board architecture having a single inter-processor bus with two processors, two SCSI interfaces and two LAN interfaces each with its own speed matching buffer, and a two-ported global memory accessible by both processors. The Auspex NS 5000 ™ Network Server uses a parallel processor architecture with multiple processors each having its own local memory and speed matching buffer, where all of the processors are connected together via a common backplane bus and a separate, common global memory board that is accessed via the common inter-processor bus. The parallel network file server architecture of the Auspex NS 5000 ™ Network Server is described in detail in U.S. Pat. No. 5,163,131, issued to Row et al.

The advantage of a multiprocessor network data server is that the work load for responding to remote file requests can be distributed over a number of processors working together, and in parallel, thereby theoretically increasing the overall performance of the network data server. Unfortunately, the current designs for multiprocessor network data servers sometimes do not achieve this theoretical increase in performance due to data transfer conflicts within the network data server. In the Auspex NS 5000 ™ Network Server as described in U.S. Pat. No. 5,163,131, for example, at least two transfers across the common bus are required in order to move a byte of data from a secondary storage device onto the network. As a result, the maximum transfer rate of the data server is necessarily less than one-half of the maximum effective data transfer rate of the common bus.

The use of a data transfer path that crosses a common bus connecting the multiple processors in the current multiprocessor network data servers can delay the parallel processing of other remote file requests which may also contending for the common bus. Obviously, one solution in the prior art is to provide for multiple data transfer paths in the form of multiple busses, as shown, for example, in U.S. Pat. No. 5,121,480, issued to Bonke et al. Such a solution, however, gives up the modular advantages of constructing the network data server using a common bus whereby additional processors can be easily added to the network data server merely by adding another processor to the common inter-processor bus. In addition, both the cost and complexity of providing for inter-processor communication via multiple busses increase significantly.

In addition to the problems caused by multiple internal transfers across a common bus, another problem with current multiprocessor network data servers is that the device controllers are not capable of simultaneous operation between both the secondary storage devices and the common bus. As a result, requests must be processed sequentially by the device controllers and the device controllers can be idled for significant periods of time waiting for operational responses from the secondary storage devices. One of the most problematic examples is the delay in waiting for the head positioning latency of a disk drive in response to a seek command. Again, multiple busses within the device controller would allow for such simultaneous operation; however, this solution necessarily increases both the cost and complexity of the device controller and, hence, of the network data server.

Although the use of multiple processors in current network data servers has increased the performance of such data servers, it would be advantageous to provide a network data server with an improved data transfer architecture that overcomes the disadvantages of current duplicate data path transfers, while at the same time retaining the advantages of using a common inter-processor bus for a multiprocessor network data server. It would also be advantageous to provide a multiprocessor network data server with an improved data transfer architecture within the device processor that would allow for multiplexed operation between the device processor and both the secondary storage devices and a common inter-processor bus.

SUMMARY OF THE INVENTION

The present invention is a method and apparatus for a pipelined data server having an improved data transfer architecture. The pipelined data server is used with a distributed computer network and a plurality of secondary storage devices to efficiently transfer data between the network and the secondary storage devices. The pipelined, multiprocessor data server includes a common inter-processor bus that connects one or more communication processors and file processors to one or more device processors, each having a buffer memory as part of the device processor. The common bus provides for global direct access to each of the buffer memories in the device processors by any of the other processors. The buffer memories are also connected to the secondary storage device attached to the device processor by a DMA transfer path in the device processor. In this way, data transfers can occur between the secondary storage device and the network with only one data transfer across the common bus.

The data transfer architecture of the device processor of the present invention is also organized in a pipelined manner so as to allow for multiplexed data transfers among the microprocessor, bus interface, I/O controller and buffer memory which comprise the device processor. As a result, the microprocessor can be communicating with the I/O controller to set up the I/O commands for another data transfer at the same time that the results of the current data transfer are being communicated with the common bus and on out to the network. The ability to multiplex communications within the device processor significantly improves the overall performance of the pipelined data server by making effective use of all of the capabilities of the pipelined device processor. For example, the device processor can be transferring its buffer memory to the communication processor during the disk positioning latencies that are normally encountered when requesting a new track and sector on the disk drive. As a result, the impact of these positioning latencies is effectively hidden and do not impact the maximum data transfer capability of the data server.

Accordingly, it is a primary objective of the present invention to provide a pipelined, multiprocessing network data server that manages memory transfers within the data server so as to minimize duplicate data transfers and maximize overall system performance.

Another objective of the present invention is to provide a data transfer architecture for a pipelined network data server that overcomes the disadvantages of current duplicate data path transfers, while at the same time retaining the advantages of using a common inter-processor bus for a multiprocessor network data server.

Still another objective of the present invention is to provide a device processor for a multiprocessor network data server that allows for multiplexed operation between the device processor and both the secondary storage devices and a common inter-processor bus.

These and other objectives of the present invention will become apparent with reference to the drawings, the detailed description of the preferred embodiment and the appended claims.

BRIEF DESCRIPTION OF THE DRAWINGS

FIG. 1b is a flow diagram of the data transfer for a read operation performed by the multiprocessor network data server of FIG. 1a.

FIG. 2a is a block diagram of another prior art multiprocessor network data server.

FIG. 2b is a flow diagram of the data transfer for a read operation performed by the multiprocessor network data server of FIG. 2a.

FIG. 4b is a flow diagram of the data transfer for a read operation performed by the pipelined network data server of FIG. 4a.

DETAILED DESCRIPTION OF THE PREFERRED EMBODIMENT

In describing the preferred embodiment of the present invention, a general understanding of the operation of network file transfers is assumed. For a background description of how the pipelined network data server of the present invention would be utilized as part of a distributed computer network environment, reference is made to the previously identified co-pending application entitled "ARCHIVING FILE SYSTEM FOR A DATA SERVER IN A DISTRIBUTED NETWORK ENVIRONMENT".

Referring to FIGS. 1a–1b and 2a–2b, the data transfer architecture of two different types of prior art multiprocessor network data servers will be described. A typical computer network environment of the type shown in FIGS. 1a and 2a will include a plurality of user nodes 10, such as workstations, graphics terminals or personal computers, which are connected via a network 12 to a data server 14 having a number of secondary storage devices 16.

Figure 1B:
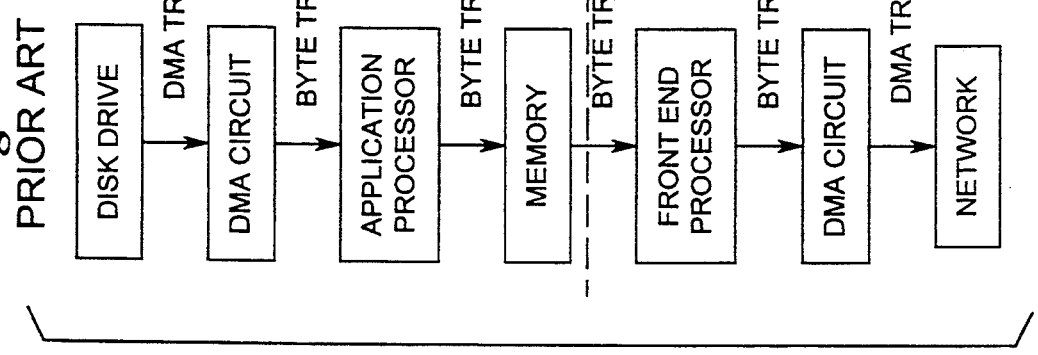
Figure 1A:
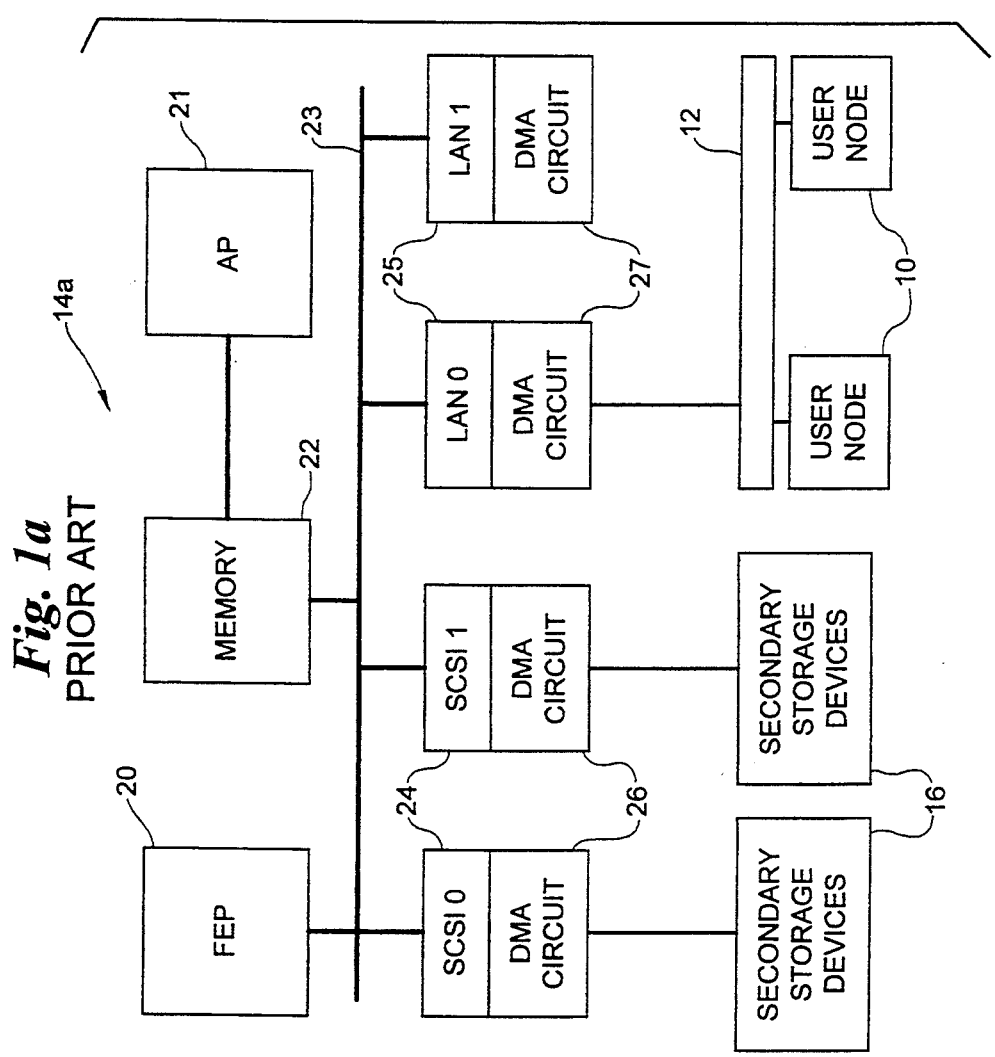
FIG. 1a is a block diagram of a prior art multiprocessor network data server.

The prior art multiprocessor network data server 14a shown in FIG. 1a utilizes a pair of processors, front end processor (FEP) 20 and application processor (AP) 21, that are connected to a dual ported memory 22 and to a common inter-processor card bus 23. Also connected to the common card bus are two SCSI ports 24, SCSI 0 and SCSI 1, and two LAN ports 25, LAN 0 and LAN 1. Each port is provided with a DMA transfer circuit 26 between the SCSI ports 24 and the secondary storage devices 16 and a DMA transfer circuit 27 between the LAN ports 25 and the network 12, which in this example is an IEEE 802.3 EtherNet ®-compatible network. All of the components of the multiprocessor network data server 14a are populated on a single circuit card (not shown). The common inter-processor card bus 23 is a non-intelligent bus interface that is controlled by either of the processors 20, 21. As a result, data transfers internal to the prior art multiprocessor data server 14a occur under control of one of the processors 20, 21 and there is no effective ability to implement a DMA-type transfer internal to the data server 14a.

FIG. 1b shows the data transfer path through the prior art multiprocessor data server 14a for a typical block-oriented read operation where an entire block of data is read from one of the SCSI ports 24 into the memory 22 before being transferred out one of the LAN ports 25. Although the byte transfer speeds across the card bus 23 are significantly greater than data transfer speed for either the SCSI ports 24 or the LAN ports 25, the fact that at least four separate byte-oriented transfers across the card bus 23 are required in order to move the data to be read from the SCSI port 24 to the LAN port 25 significantly impacts on the overall data transfer performance of the prior art multiprocessor data server 14a.

Referring now to FIG. 2a, transfer a second prior art multiprocessor network data server 14b will be described. A common backplane bus 30 provides an intelligent communication interface among a number of processor cards connected to the backplane bus 30. The processor cards include one or more network cards 31 for interfacing with the network 12, a global memory card 32 having all of the global memory for the data server 14b, a host processor card 33, one or more file cards 34 for implementing the file commands of the standard System V file system, and one or more storage cards 35 for controlling the secondary storage devices 16 attached thereto by a SCSI interface. As with the prior art multiprocessor data server 14a, a DMA transfer circuit 36 is provided between each storage card 35 and the secondary storage devices 16, and a DMA transfer circuit 37 is provided between each network card 31 and the network 12.

FIG. 2b shows the data transfer path through the prior art multiprocessor data server 14b for a typical block-oriented read operation where an entire block of data is read from one of storage cards 35 into the memory 32 before being transferred out one of the network cards 31. It will be seen that due to the fact that the backplane bus 30 is capable of supporting DMA transfers internal to the multiprocessor data server 14b, the overall data transfer path is much shorter than for the multiprocessor network data server 14a. As described in the background of the invention, the problem with the data transfer path in this type of prior art multiprocessor network data server 14b is that at least two transfers across the common bus 30 are required in order to move a byte of data from a secondary storage device 16 onto the network 12. As a result, the maximum transfer rate of the data server 14b is necessarily less than one-half of the maximum effective data transfer rate of the common bus 30.

Figure 3:
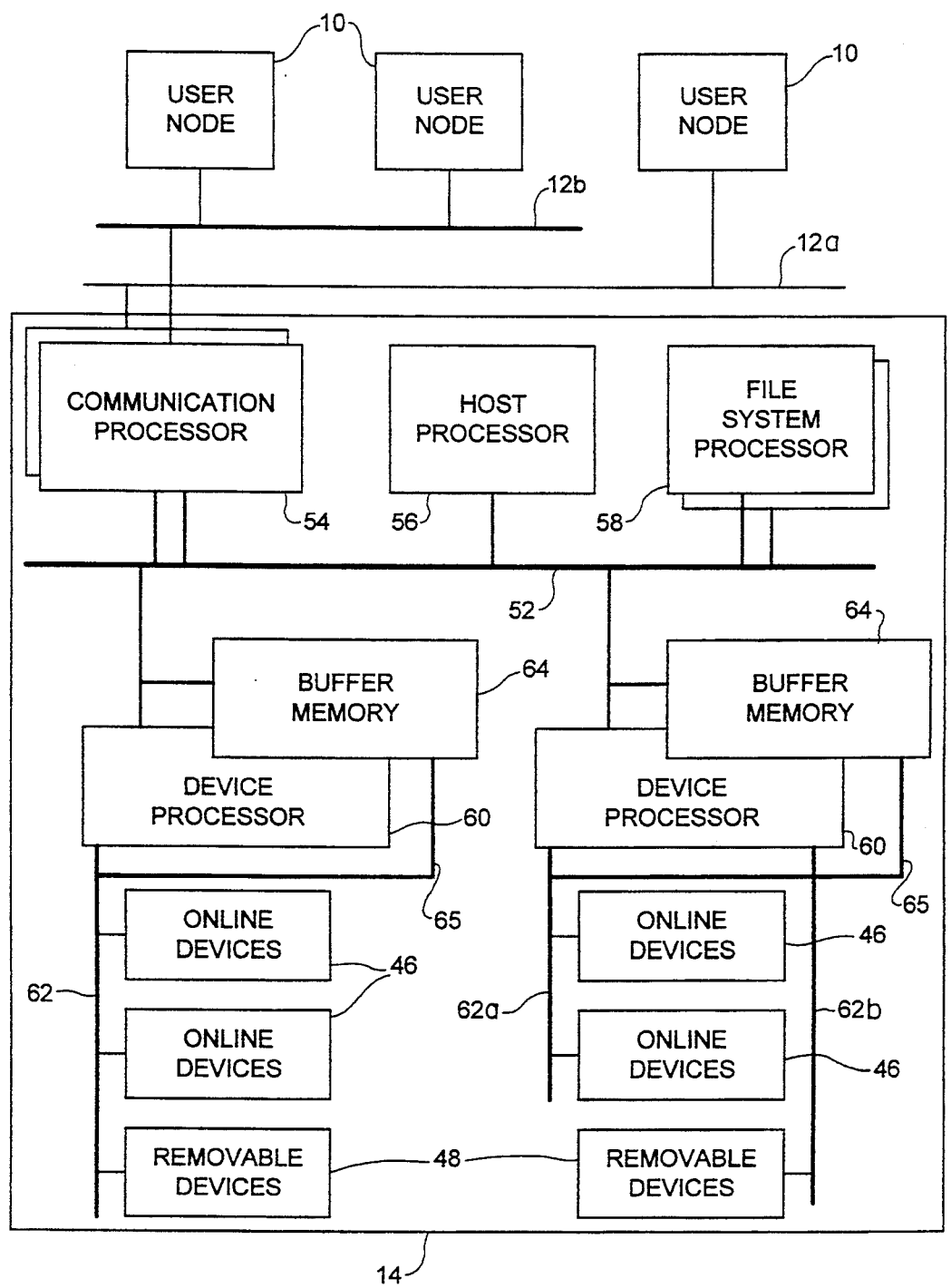
FIG. 3 is an overall block diagram of the pipelined network data server of the present invention.

An overall block diagram of the preferred embodiment of the pipelined, multiprocessor network data server 14 of the present invention is shown in FIG. 3.

The pipelined network data server 14 is implemented using a number of microprocessor boards operating in a pipelined, multiprocessing environment and all connected to a common backplane VME bus 52 for intelligent inter-processor communication within the pipelined data server 14. In this configuration, one or more communication processors 54 or an EtherNet ® port of a host processor 56 are used to interface the pipelined data server 14 with the distributed computer networks, such as EtherNet ® 12a, FDDI 12b, or Fibre Channel or any other type of Transport Control Protocol/Internet Protocol (TCP/IP) network. The host processor 56 executes standard Unix ® System V, Release 4.0 operating system code to allow the pipelined data server 14 to present the standard Unix ® interface to the networks 12 to which the pipelined data server 14 is connected. In the preferred embodiment, one or more real-time file system processors 58 execute a unique control program as described in the previously identified co-pending application, although it will be recognized that the standard, System V file system could also be implemented by the pipelined data server 40 of the present invention. One or more device processors 60 are also connected to the VME bus 52 to physically control the I/O operations of the plurality of remote secondary storage devices, either online secondary storage devices 46 or removable secondary storage devices 48 that are connected to the particular device processor 60 in the pipelined data server 40 by one or more SCSI busses 62a, 62b.

In the preferred embodiment, each of the file system processors 58 is assigned one or more unique device processors 60 to control, and no device processor 60 is assigned to more than one file system processor 58 in order to minimize synchronization and contention problems within the pipelined data server 14. Each of the device processors 60 contains a buffer memory 64 connected by direct DMA access 65 to the ports for the SCSI busses 62a and 62b. The buffer memory 64 is also connected to the VME bus 52 to form part of a VME global data buffer memory space accessible by all of the processor boards 54, 56, 58 and 60. In the preferred embodiment, each buffer memory 64 has a unique 16 Mbytes of VME memory space, and the pipelined data server 14 may be populated with a total of fourteen device processors 60, each having a buffer memory 64 with 16 Mbytes of memory space for a total VME global memory space of 224 Mbytes for the pipelined data server 14. The buffer memory 64 in each device processor 60 is managed by the file control program of the pipelined data server 14 so as to implement a direct DMA transfer between the buffer memory 64 and the communication processor 54. This eliminates the need for duplicate transfers of information within the pipelined data server 40 when responding to a transfer request, thereby significantly increasing the overall data transfer speed of the pipelined network data server 14.

The pipelined, multiprocessing environment is preferred for the data server 14 so as to distribute the work load of responding to user nodes 10 on the networks 12 that initiate requests for remote files 42. When a request for a remote file has been received over a network 12 by a communication processor 54, it is partially cracked or decoded. Cracking refers to the decoding of the commands that make up the request for the remote file 42 so that the specified operation and file name are known to the pipelined data server 14. The partially cracked command is then passed onto the host processor 56 where the cracking or decoding is largely completed. Once a remote file command has been completely cracked by the host processor 56, the host processor 56 passes that command over the VME bus 52 to the file control program executing in the file processor 58 that has been assigned responsibility for the remote file tree 44 on which the requested remote file 42 is stored.

Figure 4B:
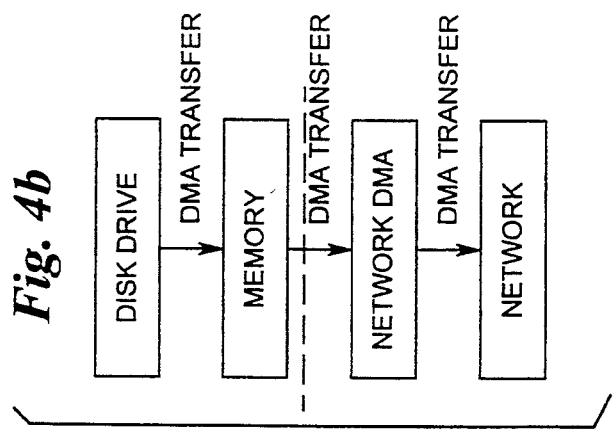
Figure 4A:
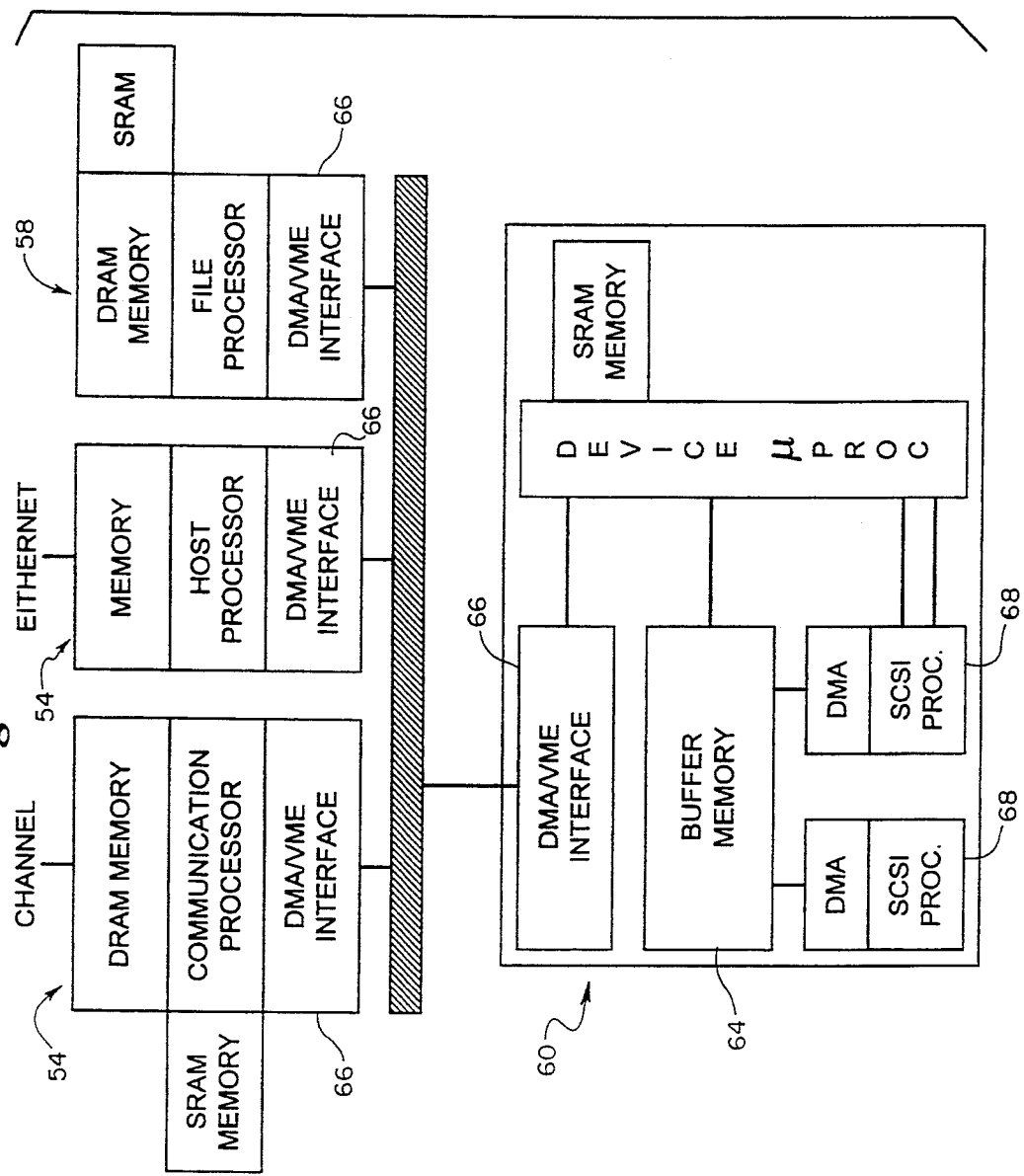
FIG. 4a is a detailed block diagram of the pipelined network data server of the present invention.

Referring now to FIG. 4a, a more detailed description of the hardware of the preferred embodiment of the pipelined data server 14 will be presented. Only one of each of the processor boards is shown in FIG. 4a for ease of representation. The VME bus 52 is a standard VME backplane bus for a sixteen card slot chassis available from Bicc-Vero, Inc., Hampshire, England. For a more detailed description of the operation of the intelligent VME bus, reference is made to *The VMEbus Specification*, Rev. D, VFEA Int'l Trade Assoc. (1991) Scottsdale, Ariz. The VME bus has a maximum data transfer rate of 80 Mbytes/sec when operating in D64 transfer mode. The communication processor 54 is an EagleTM communication card for an EtherNet® IEEE 802.3 network, or an FDDI communication card for the FDDI network, both of which are available from Interphase, Inc., Dallas, Tex. The EtherNet® network has a maximum data transfer rate of 10 Mbits/sec and the FDDI network has a maximum data transfer rate of 1OO Mbits/sec. For the Fibre Channel network, the communication processor 54 is a variation of one of the processor boards described below that uses a VHSCI chip set available from Ancor Communications, Inc., Minnetonka, Minn. to interface with the current Fibre Channel standards. The Fibre Channel network currently has a maximum data transfer rate of 266 Mbits/sec. The host processor 56 is either a host 167 host card with a 68040 microprocessor, or a 187 host card with a RISC microprocessor, both of which are available from Motorola, Inc., Schaumberg, Ill. The DMA/VME interface 66 for each of the processor boards is a D64VME Chip 2 also available from Motorola, Inc., or a compatible VME interface chip set. The SCSI processor 68 is an NCR53C720 SCSI controller, available from NCR, Corp., Dayton, Ohio.

FIG. 4b shows the data transfer path through the pipelined data server 14 of the present invention for a typical block-oriented read operation where an entire block of data is read. It will be seen that the unique arrangement of the device processor cards 60 and the buffer memory 64 eliminates one of the data transfers across the VME bus 52 that is otherwise required in the prior art multiprocessor data server 14b as shown in FIG. 2b. Instead, the data is DMA transferred directly from the secondary storage device 16 by the DMA circuit of the SCSI controller 68 into the buffer memory 64. Once the entire block of data is resident in the buffer memory 64, a single transfer across the VME bus 52 is setup to transfer the data from the device processor 60 to the communication processor 54, and from there onto the network 12. As a result, the maximum transfer rate of the pipelined network data server 14 of the present invention is equal to the maximum effective data transfer rate of the VME bus 52.

In the preferred embodiment of the present invention, a similar circuit board is used for all of the processor boards except the host processor 56. The communication processor 54 for the Fibre Channel, the file system processor 58 and the device processor 60 all use the same circuit board and most of the same circuitry. The primary difference among the processor boards is the software that will execute in each processor board and whether the memory for that processor board is to be global memory in the form of buffer memory 64, or is to be private memory 70, as shown for example with the file system processor 58 in FIG. 4a.

Figure 5:
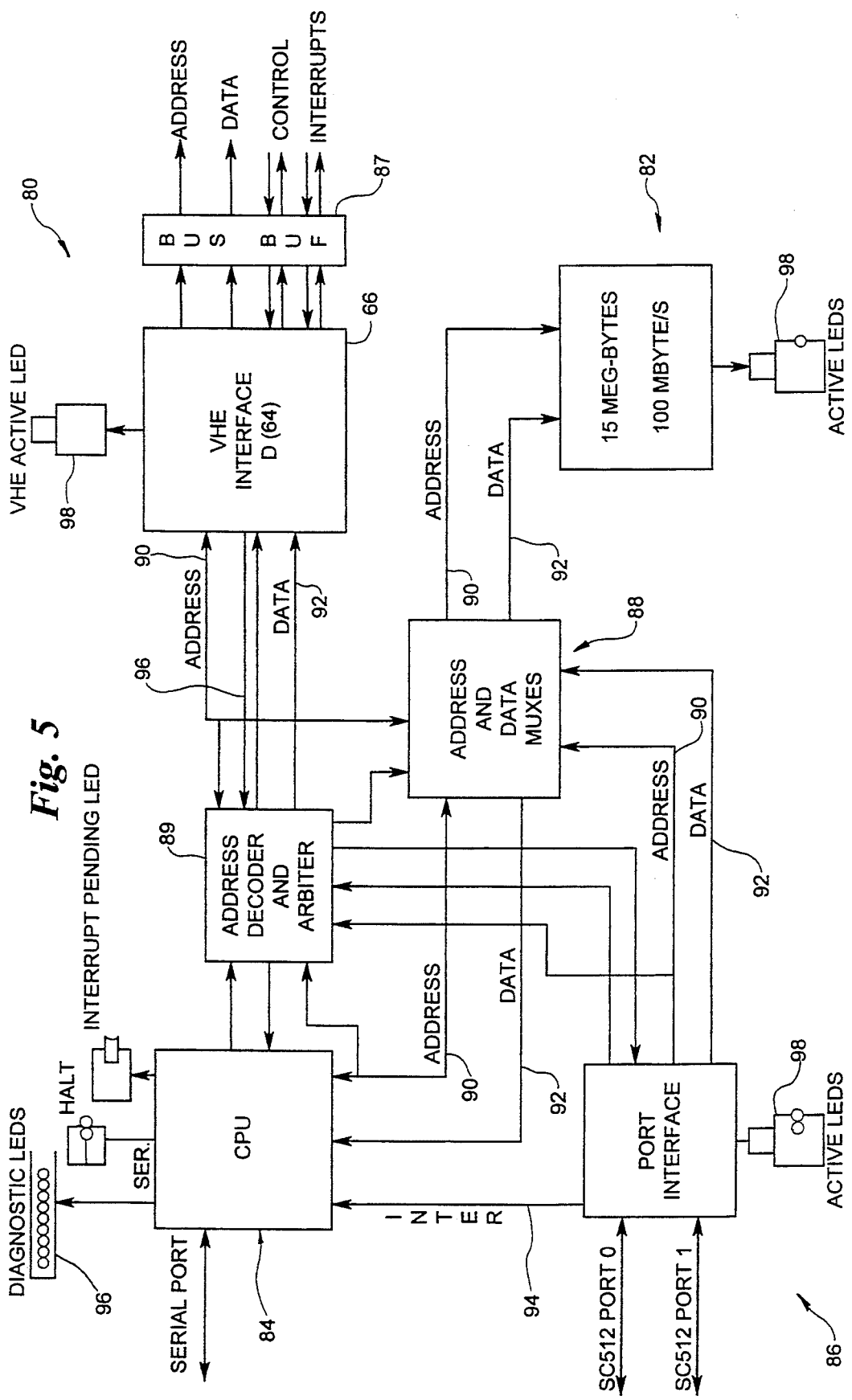
FIG. 5 is an overall functional block diagram of the processor boards of the preferred embodiment of the present invention.

As shown in FIG. 5, the common processor board 80 includes memory 82, a microprocessor 84, an input/output controller 86, the DMA/VME interface 66, including a bus buffer 87, and multiplexing logic 88, including an address decoder and arbiter 89, that allow for two separate data transfer operations to be accomplished by the common processor board 80 simultaneously over the address paths 90 and data paths 92 that interconnect each of the components 82, 84, 86 and 66 to the multiplexing logic 88. An interrupt line 94 is connected between the input/output controller 86 and the microprocessor 82, and control lines are also connected between the DME/VME interface 66 and the microprocessor 82. Several LEDs 98 are also included to monitor the activity of the processor board 80, as well as to assist in performing diagnostics.

In the preferred embodiment of the common processor board 80, the microprocessor 84 is an MC68EC030 microprocessor available from Motorola, Inc. For a more detailed description of the operation and functions of the MC68EC030 microprocessor, reference is made to the "MC68EC030 32-bit Embedded Controller User's Manual", available from Motorola, Inc. The MC68EC030 microprocessor operates at 32 MHz and includes 1 Mbytes of local control SRAM. The memory 82 is 16 Mbytes of DRAM having a peak data transfer rate of 100 Mbytes/sec. The memory 82 is capable of accessing data stored therein from a single byte to 64 bytes of data per address. Depending upon whether or not the common processor board is to be configured as a device processor 60, the memory 82 will either be a large private memory 70, or will be part of the VME global memory space as a buffer memory 64. The input/output controller 86 will also depend upon the function for which the common processor board 80 will be used. If the common processor board 80 is to be a device processor 60, then the input/output controller 86 are a pair of NCR53C720 SCSI controllers, available from NCR, Inc. If the common processor board 80 is to be a Fibre Channel communication processor 52, then the input/output controller 86 is the VHSCI chip set available from Ancor Communications, Inc., As previously indicated, the DMA/VME interface 66 for each of the processor boards is a D64VME Chip 2 available from Motorola, Inc., or a compatible VME interface chip set.

Figure 6A:
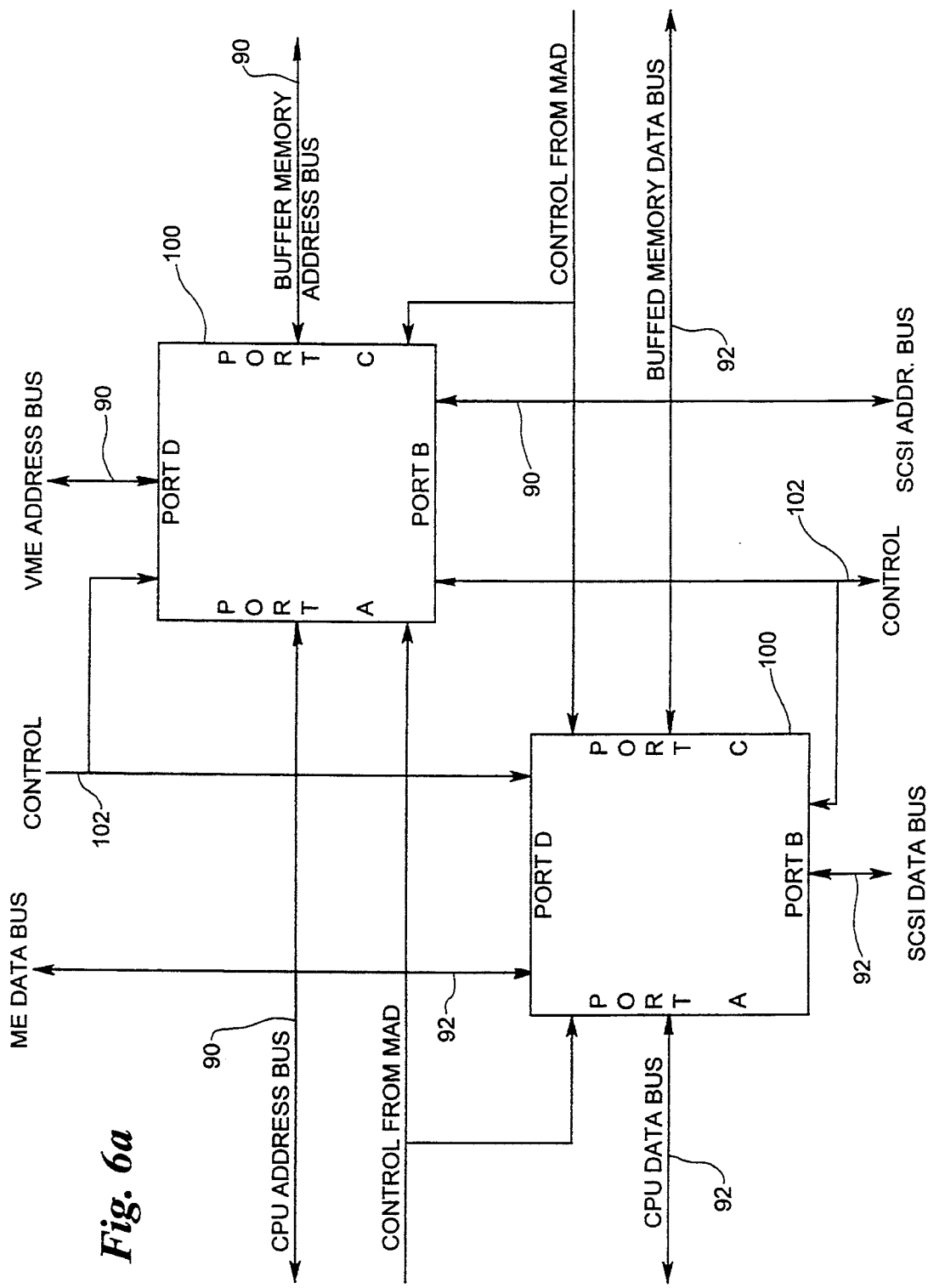
FIGS. 6a and 6b are detailed block diagrams of the support logic for the processor boards shown in FIG. 5.
Figure 6B:
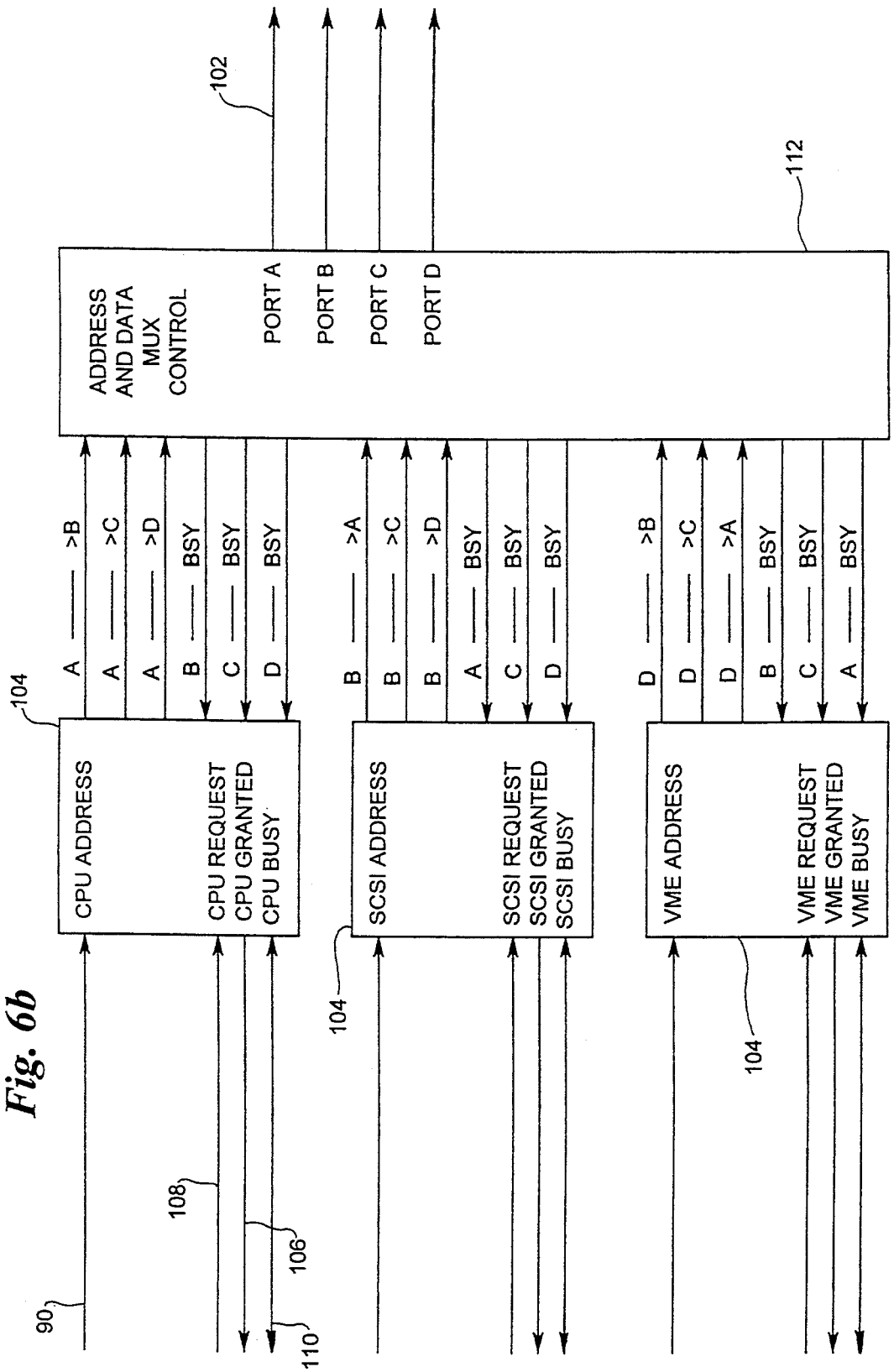

Referring now to FIGS. 6a and 6b, a detailed description of the multiplexing logic 88 and the address decoder and arbiter 89 will be presented. As shown in FIG. 6a, each of the address paths 90 and data paths 92 are connected to a unique port A,B,C,D of a series four-port multiplexor AM29C932 chips 100, available from Advanced Micro Devices, Inc., Sunnyvale, Calif. For the address paths 90, four chips 100 are used and for the data paths 92, five chips 100 are used. A control line 102 for each port A,B,C,D of each chip 100 is supplied by the address decoder and arbiter 89 that determines what connection will be established within the multiplexor chips 100.

FIG. 6b shows the details of the address decoder and arbiter 89 that supplies the control lines 102 to the multiplexor chips 100. Three PALs 104 are provided, one being connected to the address paths 90 of each of the microprocessor 82, the input/output controller 86 and the DMA/VME interface 66. The PALs 104 supply each of these components with a Grant signal 106 in response to a Request signal 108 and a Busy signal 110. Each of the PALs 104 is in turn connected to a mux control 112 that arbitrates among the various Request signals 108 and Busy signals 110 to determine which data paths 92 will be established through the multiplexor chips 100 and supplies the control lines 102 to each of the four ports A, B, C and D of the multiplexor chips 100 for that purpose.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

What is claimed is:

1. An integrated data server for use with a distributed computer network and a plurality of secondary storage devices, comprising:

at least one communication processor means operably connected to the computer network for receiving commands from a plurality of user nodes on the computer network to access and store one or more remote files using the integrated data server;

at least one device processor means operably connected to the plurality of secondary storage devices for controlling access to and storage of the remote files on the secondary storage devices, each device processor means including a globally accessible buffer memory to store selected blocks of the remote files as the remote files are transferred between the globally accessible buffer memory and the secondary storage devices via a DMA transfer path in the device processor means;

file processor means for decoding the commands and managing a plurality of pointers to the globally accessible buffer memory in each device processor means to control the transfer of the remote files within the integrated data server; and a common bus connected to all of the communication processor means, the device processor means and the file processor means and providing global direct access to the globally accessible buffer memory in each device processor means such that the selected blocks of a remote file are transferred directly from the buffer memory to the computer network in response to the file processor means as a single data transfer operation involving only one transfer across the common bus means for each of the selected blocks of the remote files.

2. The integrated data server of claim 1 wherein the file processor means selectively establishes a single-transfer direct memory access (DMA) transfer between the buffer memory of a device processor means and a communication processor means that accomplishes the single data transfer operation.

* * * * *